Nov. 6, 1945.  H. B. DEAL  2,388,530
POWER LINE SIGNALING SYSTEM
Filed April 1, 1942
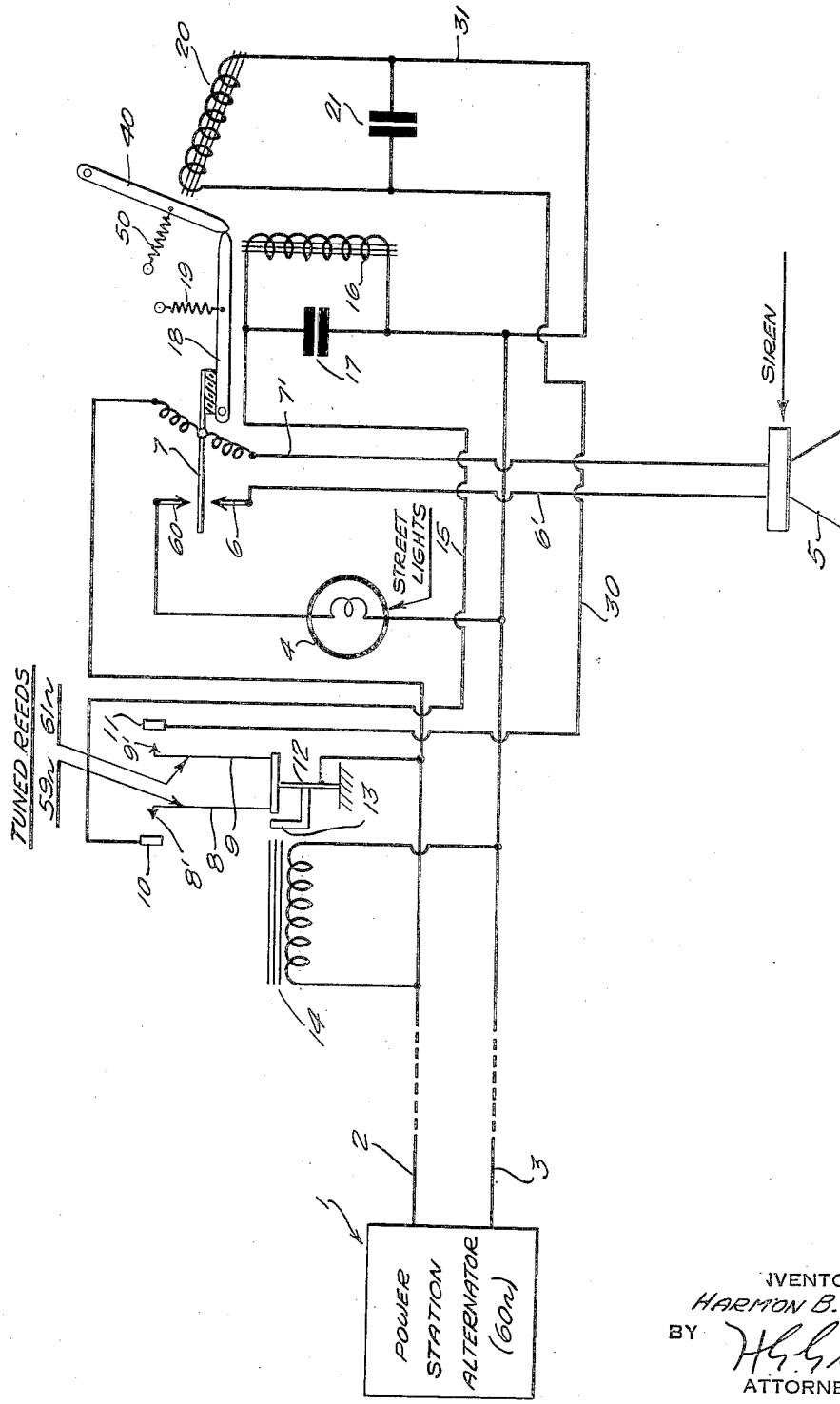
INVENTOR
HARMON B. DEAL
BY
H. G. Grover
ATTORNEY Patented Nov. 6, 1945

2,388,530

UNITED STATES PATENT OFFICE 2,388,530

POWER LINE SIGNALING SYSTEM

Harmon B. Deal, Glen Ridge, N. J., assignor to Radio Corporation of America, a corporation of Delaware Application April 1, 1942, Serial No. 437,178

1 Claim. (Cl. 177—352)

My present invention relates to power line signaling or switching systems, and more particularly to a load control device responsive to small changes of frequency of power supply mains.

In the past there have been disclosed various arrangements for transmitting warning signals by radio. These prior systems generally utilize a special modulation signal on carrier waves radiated from a transmitter. In such systems, at the various signal points, receivers are utilized which employ devices responsive to the special modulation signal for actuating warning devices, such as indicator lights, buzzers, alarm bells or special siren effects. It is necessary in such systems to have the special receiving device continually energized from the power supply mains so that the receiving equipment will continually be in a condition to receive the modulated carrier waves. On the other hand, if it is desired to economize power supply current, it is necessary for some special person to be in attendance near the receiving device so as to be able to energize the same at certain specified periods.

According to my present invention the same result can be secured without the radiation of any modulated carrier waves, without the need for special attention to a receiver device, and without the need for continuous energization of a receiving device. Instead of utilizing radiated waves, according to my invention the existing power supply mains are employed as a medium over which a signal is transmitted. There is utilized, in general, at a warning point a device which is responsive to a small change of frequency of the power transmitted over the supply mains.

Accordingly, it may be stated to be one of the main and basic objects of my present invention to provide, in combination with an existing power supply system, a device for controlling a load, and the control device being responsive to a relatively small shift in the power supply line frequency.

Another important object of the invention is to provide a method of signaling over a power supply system, wherein shifting of the line frequency by a frequency deviation as small as one percent can be utilized for producing actuation of a switching device at any desired point along the system.

Another and more specific object of the invention is to provide in combination with an alternating current power supply system, a method of actuating a signal producing device, as for example an air raid warning siren, with alternative control of street lights, which includes shifting the line frequency as little as one cycle to one side of the normal operating frequency for actuating switching mechanisms, and shifting the line frequency as little as one cycle to the opposite side of said line frequency in order to actuate complementary switching functions.

The novel features which I believe to be characteristic of my invention are set forth with particularity in the appended claims; the invention itself, however, as to both its organization and method of operation will best be understood by reference to the following description taken in connection with the drawing in which I have indicated diagrammatically a circuit organization whereby my invention may be carried into effect.

Referring now to the accompanying drawing, the numeral 1 indicates schematically the power station alternator. Those skilled in the art of power transmission are fully aware of the construction of such a power alternator. Let it be assumed that the alternator is located in the central station of a power transmission system. Numerals 2 and 3 schematically denote the power lines. Of course, here, again, the showing is schematic since the invention does not reside in the particular construction of the power supply system, but rather in a method and devices which are applicable to existing power supply systems. While the invention is explained as applicable to a power line frequency of 60 cycles, it is to be clearly understood that it is equally applicable to other line frequencies such as 25 or 133 cycles.

From a generic viewpoint my present invention relates to alternating current power line signaling, switching or controlling systems, wherein the switching, signaling or controlling is accomplished at many points throughout the power system by a variation of the power line frequency over relatively small frequency ranges, and wherein the new deviated frequency is maintained for relatively short intervals. While the invention is concerned primarily with the means of using a deviation from the normal frequency of the power system to accomplish desired switching operations at remote points on, or adjacent to, the system, a brief statement is in order as to what operations are involved at the power station in order to accomplish a change in power line frequency.

In the simplest case the entire load of a power system is supplied by a single generator. The frequency of this generator is fixed by the number of magnetic poles on the generator, and the speed of the generator. The (rotational) speed is determined by the speed of the prime mover.

The speed of the prime mover can be increased or decreased by throttle controls in the case of Diesel, or steam, prime movers, or gate openings in the case of hydro-electric generators.

Present power system practice is to hold the speed of the prime mover, and hence the frequency of the power system, constant within very narrow limits. That this is done is shown by the accuracy of synchronous clocks operating on the power system. These clocks, in general, keep accurate time though throughout the course of a day they may run somewhat fast or slow with respect to a precise clock. This shows that the power system frequency does vary above and below the long-time average frequency of the power system. These variations in frequency are caused by variations in load on the power system which cause increases in prime mover speed for a decreasing load, and decreases in this speed for increasing system load.

If sudden, or unexpected, increases of power used on the system, caused for example by a dark thundercloud, causes many users of electricity to turn on their lights, then the increase in load may temporarily overload the generator and prime mover and the system frequency falls, due to the inability of the prime mover to carry the increased load. The remedy is either to connect additional power generating equipment, or to run overloaded, if possible, until the demand slackens, and then to run the generating equipment at faster than normal speed and frequency long enough to make synchronous electric clocks on the system come back to correct time as shown on a precision master clock. It is extremely rare that synchronous motor clocks on a well run power system are in error more than a few seconds. This shows that (1) the frequency is usually held very close to the nominal system frequency when averaged over long time intervals, and (2) that the system frequency can be varied, and in fact is varying at all times for incidental reasons.

Power station practice is to use either manual or automatic controls to increase or decrease the throttle, or gate openings, of the generating prime movers to take care of the varying load and keep the system frequency constant. It follows, therefore, that the same throttle manipulation can be so operated as to increase or decrease the station frequency, if it becomes desirable to do so for any reason. If only one prime mover is involved this operation is relatively simple, and can be done in the matter of a few seconds to raise or lower the power line frequency. This would be the case for small power systems supplying small towns or communities.

In the case of extensive power networks there may be many generating stations or prime movers. These all necessarily run at the speed dictated by the then existing instantaneous frequency of the power system. This is not an approximate necessity, but an absolute one. All alternating current generators on the system must, and do, run at the system frequency as long as they are connected. Even if the prime mover of a generator should have its fuel, or steam supply, cut off, that generator continues to run as a synchronous motor at synchronous speed dragging the prime mover along with it, the power now being extracted from the power system. It is directly analogous to a group of prime movers driving a common shaft through sprocket chains or gear trains (rather than by belts which might conceivably slip). Any one prime mover might have its fuel, or steam, cut off, but until it is disconnected from the common shaft, it will continue to run at the speed dictated by the shaft speed and the connecting gear ratio. Under these conditions the shaft speed (to continue the analogy) can be changed only by changing the speeds of all the prime movers.

This can be done by throttle openings in concert by all the prime mover engineers. It can be done by increasing the throttle opening of one prime mover if that one is capable of absorbing all the increase in load (not necessarily all the load). It can, also, be accomplished by throttle openings at some two prime movers in concert, provided those two can carry the increase in load attendant upon increasing the shaft speed, or the system frequency in the case of parallel alternating current generators. Likewise, it may be seen that any combination of generators capable of carrying the increase, or decrease, of load may be operated by concerted throttle changing to obtain a change in power system frequency. Further, the power network may be sectionalized, and the frequency change accomplished on one section only. This reduces to the case of the single generator, or of a few generators on a system, instead of many.

The power increase attendant upon an increase of power line frequency is that due to increased windage and friction losses in all rotating machinery on the system, and to the increased iron losses in transformers. Since an increase of the order of 1% is contemplated, the power increase might still be carried by a large generator on even an extensive system. No added power increases in the lighting or heating part of the load results from an increased (or decreased) line frequency. There is an apparent increase in load resulting from increasing the line frequency, that comes from the added force required to increase the rotational momentum of all the connected rotating machinery. This apparent added power requirement exists only during the period in which the change is taking place, and is proportional to the rate at which the change is accomplished. Further, this situation is reversed for a decrease in the system frequency, and appears as a decrease in power required during the interval in which the frequency is being decreased. In either case it is apparent power that may temporarily (during the change) be taken by one prime mover effecting the frequency change.

To summarize, power line frequency changes of the order of 1% of nominal frequency can be readily accomplished with less than 1% change in power required. For simple single central station systems this may be accomplished in a matter of seconds, certainly within a minute. For extensive power networks it still may be accomplished by one large station on the system, or by one or more of the larger stations acting concertedly to effect the change. In this case some operational delays would be expected, and without rehearsals might involve time in the order of several minutes. It is assumed that the cooperation of the power company has been secured, and that the power line frequency can be changed from a few percent above to a few percent below nominal line frequency. It will now be shown how this frequency change may be utilized to accomplish desirable results.

For the sake of specific illustration let it be assumed that the power station 1 is that of a small town, and that the alternator is operating to provide 60 cycle current at 110 volts. In the case of such an alternator suppose that the frequency of the line current is to be lowered to 59 cycles, or raised to 61 cycles, in a comparatively short period of time. Since the line frequency need be shifted only momentarily for the purposes of my invention, the control operator at the power station need only drop the line frequency for a few seconds in order to actuate the remotely-situated controlled relays. Since the "off to on" cycle of control involves shifting to either side of 60 cycles by one cycle, the net time change of synchronous clocks on the system is zero. This follows from the fact that time lost in one control shift is regained on the complementary shift.

Of course, as stated previously the frequency shift need not be 1 cycle. With sufficiently sharp selective devices at the controlled points there may be employed frequency shifts as small as 0.25 or 0.50 cycle. However, the controlling device selective frequency should be greater than the range of incidental line frequency variation. Further, any device for accelerating the speed of line frequency shift may be used.

Assuming, now, that numeral 4 denotes a group of street lights as at a certain warning point on the system 2—3, it is desired to operate a warning device near, or at, said point in response to a shift of line frequency in one direction. It may, also, be desired to extinguish the street lights concurrently with the actuation of the warning device. Further, it is desired to render the latter ineffective in response to a line frequency shift in the opposite direction.

These operations are readily and simply carried out by connecting the device 5 into circuit with a control switch comprising metallic contact 6 and adjustable metallic switch arm 7. Lead 6' connects contact 6 to one terminal of the device 5, while lead 7' connects the switch arm 7 to the second terminal of the device. The latter can be any desired type of siren, or other generator of audible waves. Additionally, the device 5 may be a blinker or illuminating indicator. In general, the alarm device may comprise any desired load which is desired to be operated, or actuated, upon a shift in line frequency in one direction. From a generic viewpoint the nature of device 5 is immaterial. It will be termed a signal-responsive load element.

The actuation of the device 5 is controlled by tuned reeds 8 and 9, the latter comprising a frequency-responsive device. These reeds are merely illustrative of selective control elements. They are chosen because of simplicity and relatively high selectivity with respect to line frequency deviation. The reeds are mechanically resonant to opposite sides of the line frequency of 60 cycles. Thus, assume reed 8 is tuned to 59 cycles, while reed 9 is tuned to 61 cycles. The reeds are mounted in spaced relation on a common metallic support. The free end of each reed is provided with a contact element. Thus, contact element 8' is located in spaced, aligned relation with fixed contact stud 10. Contact element 9' is spaced from, and aligned with, fixed stud 11.

The reed support is, in turn, supported by a short strip of spring steel 12 whose lower end is rigidly fixed. The strip 12 carries a metallic relay armature 13 adapted to be attracted by the electromagnet 14 whose winding is connected between lines 2 and 3. In other words, upon energization of the winding of relay 14 the armature 13 is vibrated at the frequency of the energizing current. Hence, the spring strip 12 is vibrated. As a result the tuned reeds are carried to and fro. However, the individual reeds will not vibrate at their mechanical resonance, unless the frequency of the energizing current flowing through the winding of relay 14 equal the tuned frequency of the reed.

If the current flowing through the winding of relay 14 is of 60 cycles, then neither of reeds 8 or 9 will vibrate sufficiently strongly to close their respective switches. However, when the frequency at the power station is shifted to 59 cycles, then the current through the winding of relay 14 will have a frequency of 59 cycles. This will cause the reed 8 to vibrate sufficiently strongly so that contact 8' touches contact point 10. In other words, at the line frequency of 60 cycles each of reeds 8 and 9 has a small amplitude of vibration. Upon shifting the line frequency to either 59 cycles or 61 cycles, the reeds 8 and 9 are caused respectively to attain large amplitudes at their respective tuned frequencies. Hence, the contact points 8' and 9' will make momentary contacts with each of fixed studs 10 and 11 respectively solely at the respective reed frequencies.

The contact stud 10 is connected by lead 15 to one end of the winding of electromagnet 16; the winding being shunted by condenser 17. The opposite end of the winding of electromagnet 16 is connected to the line 3. It will now be seen that when contact 8' makes momentary contact with stud 10, the winding of electromagnet 16 is energized. The momentary contact between 10 and 8', or 9' and 11, is not of sufficient duration to pull the armature 18, but is sufficient to charge condenser 17. The condenser 17 discharges through the relay coil and pulls the armature 18 against the upward bias due to spring 19. The armature 18 is pivoted at one end thereof. The pivoted end has affixed to it one end of the switch arm 7, but the armature 18 and switch arm 7 are insulated from each other.

A second relay is provided which comprises an electromagnet 20 whose winding is shunted by a condenser 21, the latter being similar in function to condenser 17. Lead 30 connects contact stud 11 to one end of the winding of electromagnet 20, while the opposite end of the winding is connected by lead 31 to line 3. Hence, it will be appreciated that when contact point 9' of reed 9 makes momentary contact with stud 11, then the winding of electromagnet 20 is energized due to the discharging action of condenser 21. The electromagnet 20 is provided with its own armature 40. The latter is pivoted at one end thereof. The spring 50 normally biases the armature 40 away from the attracting end of the electromagnet 20.

The free ends of armatures 18 and 40 are so relatively arranged that when the free end of armature 18 is pulled towards the electromagnet 16, then spring 50 pulls the free end of armature 40 over the free end of armature 18. Thus, armature 40 serves as a locking device to prevent the return of armature 18 from its attracted position. This is true even though the energizing current is not flowing through the winding of electromagnet 16. Upon energization of the winding of electromagnet 20, the armature 40 will be pulled towards the electromagnet 20 against the bias of spring 50. This will cause the armature 18 to be free to be pulled by its spring 19 into its uppermost position. In this position switch 6—7 is closed, and the siren device 5 is operative to warn all those in audible range of an impending emergency, such as an air raid.

If desired, the street lights may be extinguished as the siren commences to sound its warning. This is done by having the line 2 connect to the switch arm 7. A second contact point 60 is provided in the path of switch arm 7. The contact point 60 is electrically connected to line 3 through the street lights. Hence, the switch 7—60 will only be closed to maintain the street lights energized when electromagnet 16 has been energized. This is so, because after such energization, the armature 40 is able to lock the armature 18 so as to maintain switch 7—60 closed. Of course, the siren is not operative by virtue of switch 6—7 being open. Assuming, now, that the power station operator wishes to transmit an air raid warning signal to the various warning stations, he shifts the line frequency to 61 cycles.

Such a frequency shift causes reed 9 to vibrate strongly thereby causing momentary contacts of switch elements 9'—11. These momentary contacts charge condenser 21. Discharge of the latter causes the winding of electromagnet 20 to be energized thereby pulling armature 40 against the bias of spring 50. The armature 18 is released. As a result switch 60—7 is opened, and siren switch 6—7 is closed. The operator has now transmitted his warning. The emergency having passed after a short time, the power station operator shifts the line frequency to 59 cycles. This causes reed 8 to vibrate strongly, and causes momentary contacts between elements 10 and 8'. Condenser 17 is charged.

Upon discharge the winding of electromagnet 16 is energized thereby pulling armature 18 against the bias of spring 19. The free end of armature 40 will now be pulled into locking position thereby retaining switch 60—7 closed, even though electromagnet 16 is not energized any further. The system may now operate at its normal 60 cycle frequency, and the amplitude of neither reed will be sufficient to cause contacts of the respective reed switches. It is emphasized that the line frequency is shifted for only a few seconds; just sufficient to energize either of the electromagnets 16 or 20.

It is to be clearly understood that a separate switch may control the street lights, the switch having its own electromagnet relay which is actuated by a reed in addition to the two shown reeds. Of course, the siren may be arranged to derive its energizing power from the power lines 2—3. Additionally, the invention is not limited to the particular devices to be energized, since any other desired load can be actuated by this system. Further, the present system for controlling an air raid siren or street lights is purely illustrative. Broadly I have provided a method of achieving control over remote devices over the very power lines which supply the power to be controlled at one or more points of the system.

While I have indicated and described a system for carrying my invention into effect, it will be apparent to one skilled in the art that my invention is by no means limited to the particular organization shown and described, but that many modifications may be made without departing from the scope of my invention, as set forth in the appended claim.

What I claim is:

In an alternating current supply system having a current distribution line provided with at least two separate devices to be energized by the current, switch means for normally connecting one device to said line for energization thereof, magnetic means for locking said switch means in its normal connection condition, a first electromagnet for controlling said magnetic means, a first frequency-responsive means, sharply tuned to a frequency differing by a relatively small value from the normal current frequency, for energizing said electromagnet with said current for rendering said locking means ineffective in response to a shift in said current frequency to said different frequency thereby to disconnect said switch means, a second electromagnet, the said switch means including a magnetic portion, a second frequency-responsive means, sharply tuned to a frequency differing from said normal current frequency by said small value but in the opposite sense, for energizing said second electromagnet in response to a shift in said current frequency to said opposite different frequency whereby said second electromagnet attracts said magnetic portion for restoring said switch means to its normal connection condition, said first electromagnet being de-energized in response to said second electromagnet becoming energized thereby simultaneously permitting said locking means to become effective, and means electrically connecting said switch means to the second device of said two devices in response to the switch means being in said unlocked and disconnected condition, said first device being a source of illumination, and said second device being a siren.

HARMON B. DEAL.